(12) United States Patent
Matsuda et al.

(10) Patent No.: US 10,629,170 B2
(45) Date of Patent: Apr. 21, 2020

(54) BOARD FOR MUSICAL INSTRUMENT, AND STRINGED INSTRUMENT

(71) Applicant: Yamaha Corporation, Hamamatsu-shi, Shizuoka (JP)

(72) Inventors: Asumi Matsuda, Hamamatsu (JP); Tomoya Miyata, Hamamatsu (JP); Kazuyuki Kobayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 16/394,770

(22) Filed: Apr. 25, 2019

(65) Prior Publication Data
US 2019/0251932 A1 Aug. 15, 2019

Related U.S. Application Data

(63) Continuation of application No. PCT/JP2017/038052, filed on Oct. 20, 2017.

(30) Foreign Application Priority Data

Oct. 26, 2016 (JP) .................................. 2016-210032

(51) Int. Cl.
*G10D 3/06* (2020.01)
*B32B 27/12* (2006.01)
(Continued)

(52) U.S. Cl.
CPC .................. *G10D 3/06* (2013.01); *B27M 3/00* (2013.01); *B32B 27/12* (2013.01); *G10C 3/06* (2013.01);
(Continued)

(58) Field of Classification Search
CPC .. G10D 3/06; G10D 1/02; G10D 1/08; G10D 3/02; B32B 27/12; B32B 2250/40;
(Continued)

(56) References Cited

U.S. PATENT DOCUMENTS

| 3,880,040 A * | 4/1975 | Kaman ................. G10D 1/005 84/291 |
| 6,294,718 B1 | 9/2001 | Saunders, Jr. et al. |
| 2008/0251187 A1* | 10/2008 | Haque ..................... D04H 1/42 156/148 |

FOREIGN PATENT DOCUMENTS

| JP | 56-64394 A | 6/1981 |
| JP | 57-187492 U1 | 11/1982 |

(Continued)

OTHER PUBLICATIONS

International Search Report (PCT/ISA/210) issued in PCT Application No. PCT/JP2017/038052 dated Jan. 9, 2018 with English translation (four (4) pages).
(Continued)

*Primary Examiner* — Kimberly R Lockett
(74) *Attorney, Agent, or Firm* — Crowell & Moring LLP (57) ABSTRACT

The board for a musical instrument according to the present disclosure includes: a first base layer; and a pair of first reinforcement layers laminated on both face sides of the first base layer, in which the first reinforcement layers includes a fiber and a binder, and the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber.

5 Claims, 8 Drawing Sheets

(51) Int. Cl.
- *G10C 3/06* (2006.01)
- *G10D 1/02* (2006.01)
- *G10D 3/02* (2006.01)
- *G10D 1/00* (2020.01)
- *G10D 1/08* (2006.01)
- *B27M 3/00* (2006.01)
- *B32B 27/08* (2006.01)
- *B32B 21/08* (2006.01)
- *B32B 21/10* (2006.01)

(52) U.S. Cl.
CPC ............... *G10D 1/005* (2013.01); *G10D 1/02* (2013.01); *G10D 1/08* (2013.01); *G10D 3/02* (2013.01); *B32B 21/08* (2013.01); *B32B 21/10* (2013.01); *B32B 27/08* (2013.01); *B32B 2250/40* (2013.01); *B32B 2307/554* (2013.01)

(58) Field of Classification Search
CPC ... B32B 2307/554; B32B 27/08; B32B 21/08; B32B 21/10; B27M 3/00; G10C 3/06
See application file for complete search history.

(56) References Cited

FOREIGN PATENT DOCUMENTS

| | | |
|---|---|---|
| JP | 9-160539 | 6/1997 |
| JP | 2001-356759 A | 12/2001 |

OTHER PUBLICATIONS

Japanese-language Written Opinion (PCT/ISA/237) issued in PCT Application No. PCT/JP2017/038052 dated Jan. 9, 2018 (four (4) pages).

\* cited by examiner

BOARD FOR MUSICAL INSTRUMENT, AND STRINGED INSTRUMENT

CROSS-REFERENCE TO RELATED APPLICATIONS

This application is a continuation application of International Application No. PCT/JP2017/038052, filed on Oct. 20, 2017, which claims priority to Japanese Patent Application No. 2016-210032 filed in Japan on Oct. 26, 2016. The entire disclosures of International Application No. PCT/JP2017/038052 and Japanese Patent Application No. 2016-210032 are hereby incorporated herein by reference.

BACKGROUND

Technical Field

The present disclosure relates to a technology for board for a musical instrument and a stringed instrument.

Background Information

In stringed instruments and the like, a board is used as a vibration plate for transmitting vibration. The board is composed of, for example, wood. However, the board composed of wood is likely to be deformed due to a change in humidity, and the deformation may lead to deterioration of acoustic characteristics.

In light of such a disadvantage, a "stringed musical instrument top member" (see Japanese Laid-Open Patent Application No. 2001-356759) has been proposed. The top member disclosed in this publication includes: a wood layer; and a pair of composite material layers laminated on both face sides of the wood layer, in which the pair of composite material layers includes a woven fabric of carbon fibers. The top member has the strength and the weather resistance which can be each enhanced by including the carbon fibers in the pair of composite material layers, whereby the top member is capable of being prevented from deformation.

SUMMARY

However, when wood is reinforced with a composite material layer including carbon fibers as in the case of the top member disclosed in the publication, the strength and the weather resistance of the top member can be enhanced to some extent, whereas the vibration characteristics may deviate from those of wood. Thus, this top member may have deteriorated acoustic characteristics, whereby it may be difficult to produce a tone quality as desired by the player.

The present disclosure was made in view of the aforementioned problems, and an object of the present disclosure is to provide a board for a musical instrument, and a stringed instrument that is capable of exerting vibration characteristics similar to those of wood, with the strength and the weather resistance being enhanced.

According to an aspect of the present disclosure, a board for a musical instrument includes: a first base layer; and a pair of first reinforcement layers laminated on both face sides of the first base layer, in which the first reinforcement layers each include a fiber and a binder, and the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber.

According to another aspect of the present disclosure, a stringed instrument includes the board for a musical instrument according to the aspect of the invention, as a sound board.

It is to be noted that herein, the term "principal component" as referred to means a component which is of the highest content, and for example, a component of which content is 50% by mass or more. The "principal component of the reinforcement layer" as referred to herein means a component which is of the highest content among fibers included in the reinforcement layer.

DESCRIPTION OF EMBODIMENTS

The board for a musical instrument according to one mode of the present disclosure includes: a first base layer; and a pair of first reinforcement layers laminated on both face sides of the first base layer, in which the first reinforcement layers each include a fiber and a binder, and the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber.

In the board for a musical instrument of the one mode of the present disclosure, a pair of first reinforcement layers includes a fiber and a binder, and the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber. Therefore, the reinforcement of both face sides of the first base layer with the pair of first reinforcement layers enables the strength of the both face sides of the first base layer to be enhanced. In addition, since the pair of first reinforcement layers laminated on both face sides of the first base layer has the constitution as described above in the board for a musical instrument, the pair of first reinforcement layers enables prevention of access of moisture to the first base layer, thereby being capable of improving the weather resistance. Furthermore, according to findings by the present inventors, due to the first reinforcement layers including the fiber and the binder, with the fiber being of the above-specified type, the attenuation ratio of the first reinforcement layers can be approximate to the attenuation ratio of wood. Therefore, the board for a musical instrument is capable of exhibiting vibration characteristics similar to those of wood.

In the board for a musical instrument, it is preferred that a principal component of the first base layer is wood.

Further, in the board for a musical instrument, it is preferred that the first base layer is a porous layer containing a synthetic resin as a principal component.

In the board for a musical instrument, it is preferred that a second base layer is provided on an outer face side of the first reinforcement layers, and a principal component of the second base layer is identical to a principal component of the first base layer.

In the board for a musical instrument, it is preferred that a second reinforcement layer is provided on an outer face side of the second base layer, and a principal component of the second reinforcement layer is identical to a principal component of the first reinforcement layer.

The stringed instrument according to another mode of the present disclosure includes the board for a musical instrument according to the one mode of the present disclosure as a sound board.

Due to including the board for a musical instrument of the one mode of the present disclosure as a sound board, the stringed instrument of the another mode of the present disclosure is capable of inhibiting deterioration of acoustic characteristics, with the strength and the weather resistance of the sound board being enhanced.

Hereinafter, embodiments of the present disclosure will be described in detail with appropriate reference to the drawings.

First Embodiment

Board for Musical Instrument

Figure 1:
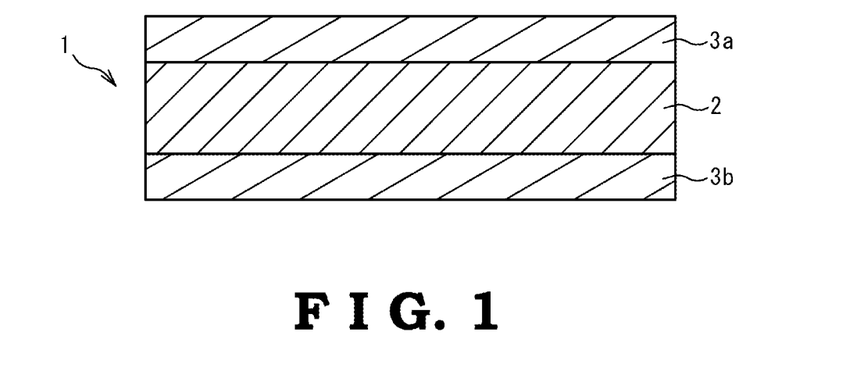
FIG. 1 is a schematic cross sectional view illustrating a board for a musical instrument according to an embodiment of the present invention.

A board for a musical instrument 1 shown in FIG. 1 includes: a first base layer 2; and a pair of first reinforcement layers 3a, 3b laminated on both face sides of the first base layer 2. The pair of first reinforcement layers 3a, 3b is directly laminated on the first base layer 2. The board for a musical instrument 1 is a three-layer structure in which the pair of first reinforcement layers 3a, 3b each constitutes an outermost layer on both sides. The first base layer 2 includes wood as a principal component. The pair of first reinforcement layers 3a, 3b includes a fiber and a binder, and the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber. Due to including wood as a principal component in the first base layer 2, the board for a musical instrument 1 allows vibration characteristics thereof to be readily approximate to those of wood. In addition, an overall cost of the board for a musical instrument 1 is likely to be reduced since the first base layer 2 contains wood as a principal component.

In the board for a musical instrument 1, the pair of first reinforcement layers 3a, 3b includes: a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber; and a binder therefor, and the modulus of elasticity of the pair of first reinforcement layers 3a, 3b is greater than the modulus of elasticity of the first base layer 2. Thus, the board for a musical instrument 1 has sufficient strength even when the overall thickness is reduced in comparison with a board for a musical instrument made of wood. Therefore, reduction in weight of the board for a musical instrument 1 can be attempted by reducing the thickness to be smaller than conventional wood board.

The lower limit of the average thickness of the board for a musical instrument 1 is preferably 1 mm, and more preferably 1.5 mm. When the average thickness is less than the lower limit, the strength of the board for a musical instrument 1 may be insufficient. It is to be noted that the "average thickness" as referred to herein means an average of thicknesses at arbitrary 10 points.

First Base Layer

The first base layer 2 is formed to be platy. Examples of the principal component of the first base layer 2 include softwood such as spruce, and hardwood such as rosewood, maple and hornbeam. Alternatively, as a forming material of the first base layer 2, plywood composed of sliced veneers of spruce, rosewood, maple, hornbeam etc., and the like may be used.

The lower limit of the average thickness of the first base layer 2 is preferably 0.8 mm, and more preferably 1 mm. When the average thickness is less than the lower limit, the strength may be insufficient.

It is preferred that both face sides of the first base layer 2 are impregnated with the binder contained in the pair of first reinforcement layers 3a, 3b. Thus impregnating the both face sides of the first base layer 2 with the binder contained in the pair of first reinforcement layers 3a, 3b enables the adhesion strength between the first base layer 2 and the pair of first reinforcement layers 3a, 3b to be enhanced. In addition, sealing of fine gaps on both face sides of the first base layer 2 with the binder enables more reduction in the water absorbing property of the first base layer 2.

The lower limit of an average depth of impregnation with the binder from both faces of the first base layer 2 is preferably 0.01 mm, and more preferably 0.05 mm. When the average depth of impregnation is less than the lower limit, sufficient filling of fine gaps on both face sides of the first base layer 2 may fail. It is to be noted that the "average depth of impregnation with the binder" as referred to herein means an average of depths of impregnation with the binder, at arbitrary ten points selected in an arbitrary cross section taken in the thickness direction.

First Reinforcement Layer

The pair of first reinforcement layers 3a, 3b is formed to be platy. The pair of first reinforcement layers 3a, 3b having been laminated on both face sides of the first base layer 2 enhances the strength of both face sides of the first base layer 2, and inhibits the first base layer 2 from absorbing moisture. Although the pair of first reinforcement layers 3a, 3b may have the fiber and the binder each being different from one another, in an attempt to provide uniform characteristics of both face sides of the first base layer 2, the fiber and the binder each being identical are preferably included.

The thicknesses of the first reinforcement layers 3a, 3b in the pair are substantially the same. Meanwhile, the average thicknesses of the first reinforcement layers 3a, 3b are less than the average thickness of the first base layer 2.

The lower limit of the average thicknesses of the first reinforcement layers 3a, 3b are preferably 50 μm, and more preferably 70 μm. When the average thicknesses are less than the lower limit, the strength of both face sides of the first base layer 2 may not be sufficiently enhanced.

The pair of first reinforcement layers 3a, 3b includes, as described above: a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber; and a binder therefor. The first reinforcement layers 3a, 3b may include two or more types of the aforementioned fibers; however, in light of an attempt to provide uniform vibration characteristics of the entirety of the first reinforcement layers 3a, 3b, only one type among the aforementioned fibers is preferably included. In addition, it is preferred that in the pair of first reinforcement layers 3a, 3b, the fiber orientation is along one direction that is substantially perpendicular to the thickness direction. In the board for a musical instrument 1, through, for example, allowing a woody textural direction of the first base layer 2 to agree with the fiber orientation direction in the pair of first reinforcement layers 3a, 3b, the strength in single direction is likely to be enhanced. Meanwhile, in the board for a musical instrument 1, through, for example, allowing a woody textural direction of the first base layer 2 to intersect with the fiber orientation direction in the pair of first reinforcement layers 3a, 3b, anisotropy can be controlled, whereby the strength in a desired direction along the fiber orientation direction can be effectively enhanced, and the vibration characteristics may be readily adjusted.

Examples of the aramid fiber include a polyparaphenyleneterephthalamide fiber, a copolyparaphenylene-3,4'-oxydiphenyleneterephthalamide fiber, a polymetaphenyleneterephthalamide fiber, and the like. Examples of the polyarylate fiber include "Vectran (registered trademark)" available from Kuraray Co., Ltd., and the like. Examples of the ultra high-molecular weight polyethylene fiber include "Dyneema (registered trademark)" available from Toyobo Co., Ltd., and the like. Examples of the polyethylene naphthalate fiber include "Teonex (registered trademark)" available from Teijin Limited, and the like. Examples of the glass fiber include an E-glass fiber, a T-glass fiber, a D-glass fiber, and the like.

Examples of the binder include thermosetting resins such as a melamine resin, an alkyd resin, an epoxy resin, a silicone resin and a polyurethane, and these may be used either alone, or as a mixture of two or more types thereof. In particular, the binder is preferably the epoxy resin. When the binder is the epoxy resin, hardening this epoxy resin while allowing the both face sides of the first base layer 2 to be impregnated therewith enables strong adhesion between the first base layer 2 and the pair of first reinforcement layers 3a, 3b, and permeation of moisture to the first base layer 2 can be inhibited.

The pair of first reinforcement layers 3a, 3b are preferably formed from a sheet-like pre-preg obtained by: allowing the polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber to be impregnated with the thermosetting resin; and semihardening the thermosetting resin. Thus forming the pair of first reinforcement layers 3a, 3b from the pre-preg enables the strength of the pair of first reinforcement layers 3a, 3b, and the adhesion strength between the pair of first reinforcement layers 3a, 3b and the first base layer 2 to be readily and reliably enhanced. It is to be noted that in the case of forming the pair of first reinforcement layers 3a, 3b from the sheet-like pre-preg, the pair of first reinforcement layers 3a, 3b may be formed from a sheet of the pre-preg, or may be formed from a laminate of a plurality of sheets of the pre-preg.

The lower limit of a Young's modulus in the fiber orientation direction in the first reinforcement layers 3a, 3b is preferably 50 GPa, and more preferably 100 GPa. Meanwhile, the upper limit of the Young's modulus in the fiber orientation direction in the first reinforcement layers 3a, 3b is preferably 600 GPa. When the Young's modulus is less than the lower limit, rigidity of the first reinforcement layers 3a, 3b may be insufficient, and the strength of both face sides of the first base layer 2 may not be sufficiently enhanced. To the contrary, when the Young's modulus is greater than the upper limit, the first reinforcement layers 3a, 3b may be so hard that vibration of the board for a musical instrument 1 may be difficult.

The upper limit of the specific gravity of the first reinforcement layers 3a, 3b is preferably 2.2. When the specific gravity of the first reinforcement layers 3a, 3b is greater than the upper limit, the reduction in weight of the board for a musical instrument 1 may not be sufficiently facilitated.

It is to be noted that the first reinforcement layers 3a, 3b may also include other component, in addition to the fiber and the binder. Examples of the other component which may be included in the first reinforcement layers 3a, 3b include a plasticizer, a crosslinking agent, a curing catalyst, a foaming agent, a foam stabilizer, an antioxidant, an ultraviolet ray absorbing agent, and the like.

Production Method

A production method of the board for a musical instrument 1 includes steps of: preparing the first base layer 2; and laminating the pair of first reinforcement layers 3a, 3b on both face sides of the first base layer 2.

First Reinforcement Layer-Laminating Step

The first reinforcement layer-laminating step includes steps of: overlaying a forming material of the pair of first reinforcement layers 3a, 3b on both face sides of the first base layer 2; and hardening the forming material of the pair of first reinforcement layers 3a, 3b laminated. It is to be noted that the step of overlaying the forming material of the first reinforcement layer 3a and the first reinforcement layer 3b may be each carried out by a similar procedure, and the step of hardening the forming material of the first reinforcement layer 3a and the first reinforcement layer 3b may be each carried out by a similar procedure. Thus, only the step of overlaying the forming material of the first reinforcement layer 3a as one of the first reinforcement layers, on one face side of the first base layer 2 (hereinafter, may be also referred to as "first overlaying step") and the step of hardening the forming material of the first reinforcement layer 3a as one of the first reinforcement layers (hereinafter, may be also referred to as "first hardening step") will be described below.

First Overlaying Step

In the first overlaying step, the sheet-like pre-preg in a semihardened state in which the polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber is impregnated with the thermosetting resin is overlaid on one face side of the first base layer 2.

First Hardening Step

In the first hardening step, the pre-preg overlaid in the first overlaying step is subjected to heat pressing on one face side of the first base layer 2. Accordingly, hardening of the thermosetting resin is enabled while one face side of the first base layer 2 is impregnated therewith, whereby strong adhesion between the first base layer 2 and the first reinforcement layer 3a is permitted and the thermosetting resin seals gaps on the first base layer 2. Thus, the water absorbing property of the first base layer 2 can be further reduced.

Stringed Instrument

Figure 2:
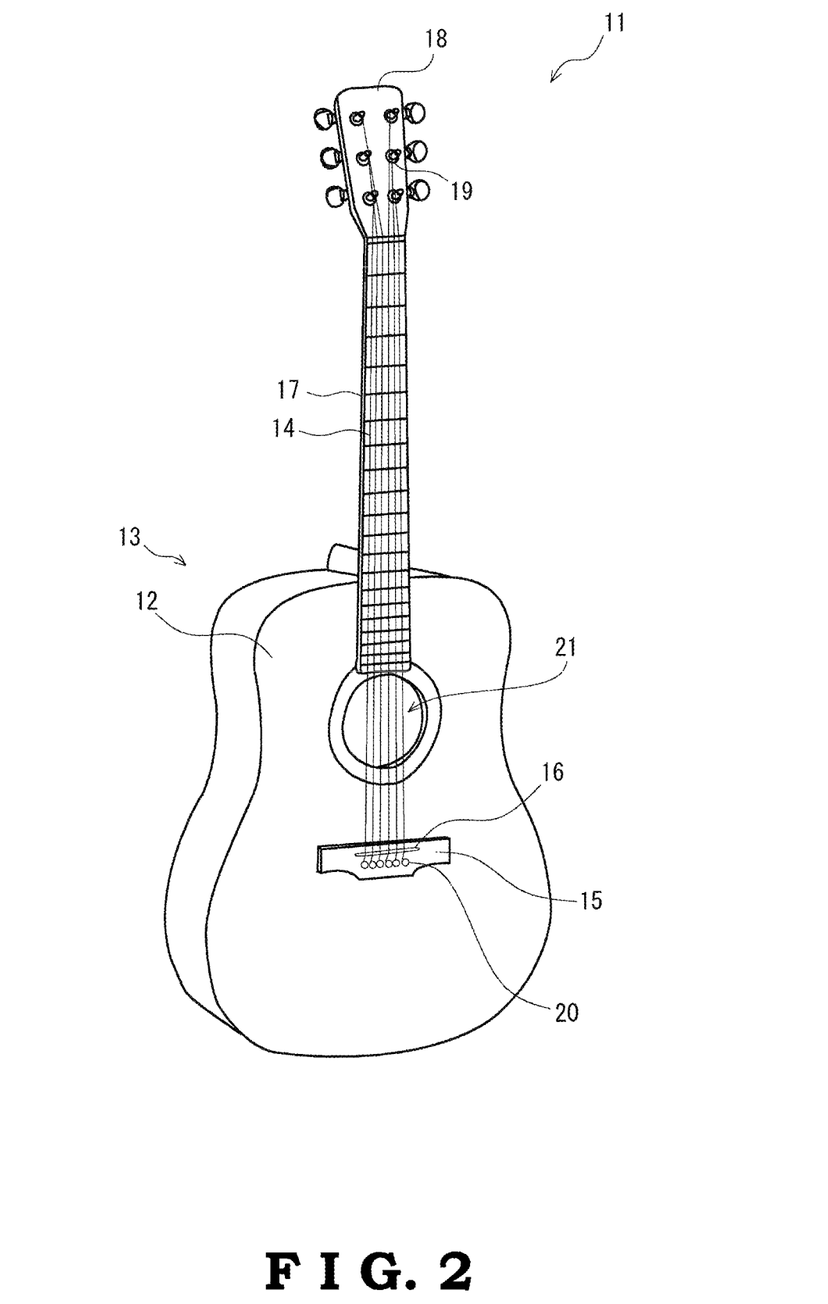
FIG. 2 is a schematic perspective view illustrating a stringed instrument that includes the board for a musical instrument shown in FIG. 1.

A stringed instrument 11 shown in FIG. 2 principally includes: a hollow body 13 having a sound board 12; a bridge 15 that is provided on an outer face side of the sound board 12 and that supports a plurality of strings 14; a saddle 16 provided on an outer surface of the bridge 15; a neck 17 that is linked to the body 13 and that extends from one end side of the sound board 12; and a head 18 provided on one end side of the neck 17. The plurality of strings 14 are, at one end sides, wound around and engaged with a plurality of pegs 19 provided on the head 18, whereas, at the other end sides, supported on a bridge 15 via a saddle 16 to be engaged with a plurality of pins 20. In addition, the sound board 12 has a sound hole 21 situated at a position between the other end of the neck 17 and the bridge 15. The stringed instrument 11 is provided with, as the sound board 12, the board for a musical instrument 1 shown in FIG. 1. The stringed instrument 11 is configured as an acoustic guitar that produces a certain sound volume through resonating the vibration of the string 14 toward the body 13.

Advantages

In the board for a musical instrument 1, the pair of first reinforcement layers 3a, 3b includes the fiber and the binder, and the fiber is the polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber. Therefore, the reinforcement of both face sides of the first base layer 2 with the pair of first reinforcement layers 3a, 3b enables the strength of the both face sides of the first base layer 2 to be enhanced. In addition, since the pair of first reinforcement layers 3a, 3b laminated on both face sides of the first base layer 2 has the constitution as described above in the board for a musical instrument 1, the pair of first reinforcement layers 3a, 3b enables prevention of access of moisture to the first base layer 2, thereby being capable of improving the weather resistance. Furthermore, according to findings by the present inventors, due to the first reinforcement layers 3a, 3b including the fiber and the binder, with the fiber being of the above-specified type, the attenuation ratio of the first reinforcement layers 3a, 3b can be approximate to the attenuation ratio of wood. Therefore, the board for a musical instrument 1 is capable of exhibiting vibration characteristics similar to those of wood.

The production method of the board for a musical instrument enables the board for a musical instrument 1 to be readily and reliably produced. In addition, according to the production method of the board for a musical instrument, by using the aforementioned pre-preg as the forming material of the first reinforcement layers 3a, 3b, more accurate control of water absorbing property of the first base layer 2 is enabled while the adhesion strength between the first base layer 2 and the pair of first reinforcement layers 3a, 3b is enhanced.

Due to including the board for a musical instrument 1 as the sound board 12, the stringed instrument 11 enables deterioration of acoustic characteristics to be inhibited, with the strength and the weather resistance of the sound board 12 being enhanced.

Second Embodiment

Board for Musical Instrument

Figure 3:
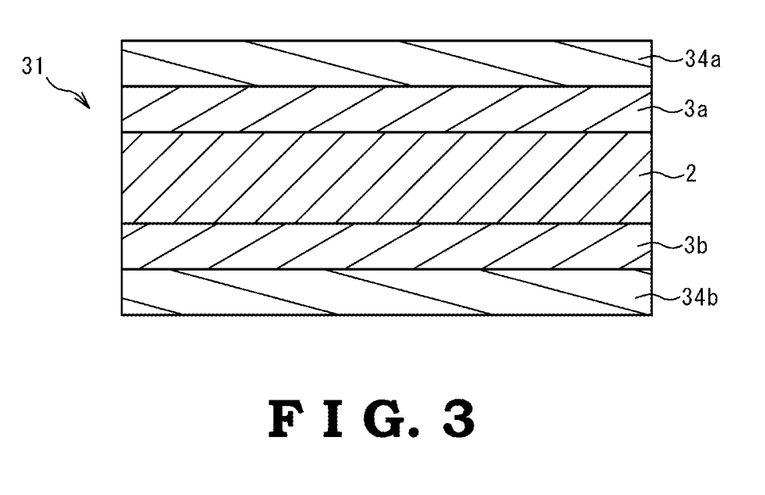
FIG. 3 is a schematic cross sectional view illustrating a board for a musical instrument according to an embodiment that differs from the board for a musical instrument shown in FIG. 1.

A board for a musical instrument 31 shown in FIG. 3 includes: a first base layer 2; a pair of first reinforcement layers 3a, 3b laminated on both face sides of the first base layer 2; and a pair of wood layers 34a, 34b laminated on outer face sides of the pair of first reinforcement layers 3a, 3b. Specific structures of the first base layer 2 and the pair of first reinforcement layers 3a, 3b in the board for a musical instrument 31 may be similar to those of the board for a musical instrument 1 shown in FIG. 1. Thus, with respect to the first base layer 2 and the pair of first reinforcement layers 3a, 3b in the board for a musical instrument 31, the description is omitted through designating with the same reference numerals as those for the board for a musical instrument 1 shown in FIG. 1.

Wood Layer

The pair of wood layers 34a, 34b is formed to be platy. The pair of wood layers 34a, 34b each constitutes an outermost layer on both sides of the board for a musical instrument 31. A principal component of the pair of wood layers 34a, 34b may be similar to the principal component of the first base layer 2 described above. Furthermore, in light of emphasis of vibration characteristics of particular wood, the principal component of the first base layer 2 is preferably identical to the principal component of the pair of wood layers 34a, 34b.

The orientation directions of wood grain of the pair of wood layers 34a, 34b may be either identical or different. However, in light of an increase in rigidity anisotropy, the orientation directions of the wood grain of the pair of wood layers 34a, 34b are preferably identical. Moreover, in this case, it is preferred that: the orientation directions of the wood grain of the pair of wood layers 34a, 34b; the orientation direction of the wood grain of the first base layer 2; and the fiber orientation directions in the pair of first reinforcement layers 3a, 3b are all identical. Meanwhile, in light of a decrease in rigidity anisotropy, it is preferred that the orientation directions of the wood grain of the pair of wood layers 34a, 34b are different from the orientation direction of the wood grain of the first base layer 2 and/or the fiber orientation directions in the pair of first reinforcement layers 3a, 3b.

The lower limit of the average thickness of the wood layers 34a, 34b is preferably 100 μm. When the average thickness is less than the lower limit, in the case in which the wood layer 34a or 34b have got scratched, for example, the first reinforcement layer 3a or 3b would be exposed, whereby the woody tone appearance of the board for a musical instrument 31 is likely to be deteriorated.

The average thickness of the board for a musical instrument 31 may be a sum of the average thickness of the pair of wood layers 34a, 34b and the average thickness of the board for a musical instrument 1 shown in FIG. 1. Specifically, the lower limit of the average thickness of the board for a musical instrument 31 is preferably 1.2 mm.

Production Method

A production method of the board for a musical instrument 31 includes steps of: preparing the first base layer 2; laminating the pair of first reinforcement layers 3a, 3b on both face sides of the first base layer 2; and laminating the pair of wood layers 34a, 34b on the outer face sides of the pair of first reinforcement layers 3a, 3b. The production method of the board for a musical instrument may be carried out by similar procedures to those in the production method of the board for a musical instrument 1 shown in FIG. 1 except that a step of laminating the pair of wood layers 34a, 34b is included. Thus, only step of laminating the pair of wood layers 34a, 34b is described below.

Wood Layer-Laminating Step

In the wood layer-laminating step, the pair of wood layers 34a, 34b may be directly laminated on outer surfaces of the pair of first reinforcement layers 3a, 3b, or the pair of wood layers 34a, 34b may be laminated on the outer surfaces of the pair of first reinforcement layers 3a, 3b via an adhesive layer.

An exemplary procedure of directly laminating the pair of wood layers 34a, 34b on outer surfaces of the pair of first reinforcement layers 3a, 3b include, for example: overlaying on the outer surface of the aforementioned pre-preg, forming each of materials of the wood layers 34a, 34b; and in the overlaid state, simultaneously adhering the first base layer 2, the first reinforcement layers 3a, 3b and the wood layers 34a, 34b at a similar heating temperature and a similar heating time period to those of the first hardening step, while a pressure similar to that in the first hardening step is applied from the outer face sides of the wood layers 34a, 34b.

Advantages

The board for a musical instrument 31 is capable of exhibiting a woody tone appearance, due to including the pair of wood layers 34a, 34b as outermost layers. Furthermore, since the board for a musical instrument 31 includes the pair of wood layers 34a, 34b as the outermost layers, incorporation thereof into a stringed instrument or the like can be readily executed by a similar procedure to those for conventional wood boards.

The production method of the board for a musical instrument enables the board for a musical instrument 31 to be readily and reliably produced.

Third Embodiment

Figure 4:
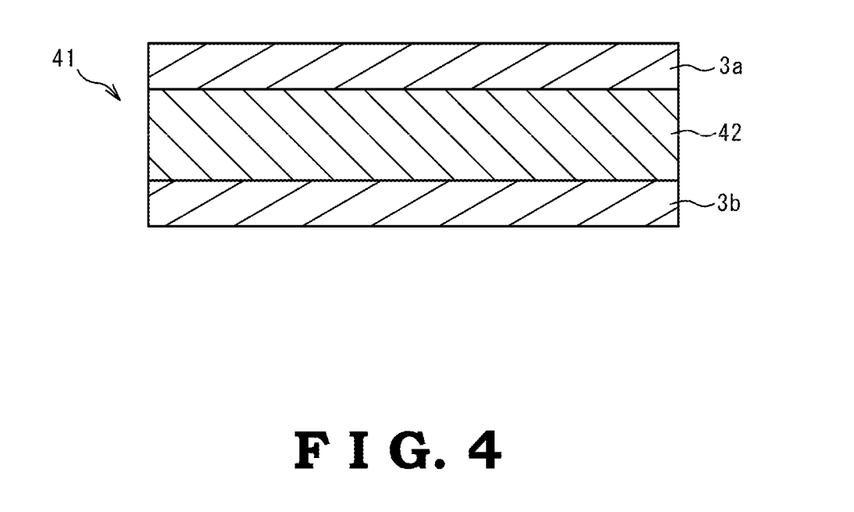
FIG. 4 is a schematic cross sectional view illustrating a board for a musical instrument according to an embodiment that differs from the boards for a musical instrument shown in FIGS. 1 and 3.

A board for a musical instrument 41 shown in FIG. 4 includes: a first base layer 42; and a pair of first reinforcement layers 3a, 3b laminated on both face sides of the first base layer 42. The pair of first reinforcement layers 3a, 3b are directly laminated on the first base layer 42. The board for a musical instrument 41 is a three-layer structure in which the pair of first reinforcement layers 3a, 3b each constitute outermost layers on both sides. Specific structures of the pair of first reinforcement layers 3a, 3b in the board for a musical instrument 41 may be similar to those of the board for a musical instrument 1 shown in FIG. 1. Thus, with respect to the pair of first reinforcement layers 3a, 3b in the board for a musical instrument 41, the description is omitted through designating with the same reference numerals as those for the board for a musical instrument 1 shown in FIG. 1.

First Base Layer

The first base layer 42 is formed to be platy. The first base layer 42 is a porous layer containing a synthetic resin as a principal component. Due to the board for a musical instrument 41 having the porous layer containing a synthetic resin as a principal component as the first base layer 42, vibration characteristics may be less likely to vary, thereby enabling uniformization of the quality to be facilitated. Moreover, in a case in which the board for a musical instrument 41 includes as the first base layer 42, a porous layer containing a synthetic resin as a principal component, vibration characteristics may be extensively adjusted by way of adjusting, for example, the type of the synthetic resin, as well as the cell diameter, the cell rate, etc. Furthermore, reduction in weight of the board for a musical instrument 41 can be facilitated due to the first base layer 42 being the porous layer containing a synthetic resin as a principal component.

The first base layer 42 may have a honeycomb structure (multi-tubular structure or multi-room structure). When the first base layer 42 has a honeycomb structure, facilitation of the reduction in weight may be enabled.

The lower limit of the average thickness of the first base layer 42 is preferably 100 μm. When the average thickness is less than the lower limit, the board for a musical instrument 41 has so small thickness that it may be difficult to use the same as, e.g., a sound board for a stringed instrument.

The first base layer 42 may be composed of a foamed body of a synthetic resin, for example. Examples of the synthetic resin include a polymethacrylimide, a polyethylene, a polypropylene, a polyurethane, a polystyrene, a phenol resin, an urea resin, a polyvinyl chloride, a silicone resin, a polyimide, a melamine resin, an and the like. In particular, the synthetic resin is preferably polymethacrylimide which is superior in heat resistance, provides comparatively high strength, and is likely to readily achieve an attempt of reduction in weight through increasing the cell rate.

In the case in which the first base layer 42 is composed of the foamed body, a plurality of cell included in the first base layer 42 are preferably closed cells. In a case of the cells in the first base layer 42 being interconnected cell, i.e., a plurality of closed cells that are interconnected, when the pair of first reinforcement layers 3a, 3b are formed by, for example, overlaying the aforementioned pre-preg on both faces of the first base layer 42, the thermosetting resin of the pre-preg may enter the interconnected cells, whereby vibration characteristics of the first base layer 4 are likely to be nonuniform. To the contrary, in the case in which cells in the first base layer 42 are closed cells, substantially uniform impregnation on both face sides of the first base layer 42 with the thermosetting resin is enabled, and therefore an attempt of uniformizing vibration characteristics of the first base layer 42 is likely to be readily achieved.

The lower limit of the Young's modulus of the first base layer 42 is preferably 50 MPa. Meanwhile, the upper limit of the Young's modulus of the first base layer 42 is preferably 200 MPa. When the Young's modulus is less than the lower limit, rigidity of the first base layer 42 may be insufficient, and in turn, sufficient enhancement of rigidity of the board for a musical instrument 41 may fail. To the contrary, when the Young's modulus is greater than the upper limit, the first base layer 52 may be so hard that vibration of the board for a musical instrument 41 may be difficult.

Production Method

A production method of the board for a musical instrument 41 includes steps of: preparing the first base layer 42; and laminating the pair of first reinforcement layers 3a, 3b on both face sides of the first base layer 42. The first reinforcement layer-laminating step in the production method of the board for a musical instrument may be carried out by similar procedures to those in the production method of the board for a musical instrument 1 shown in FIG. 1.

Advantages

Due to including the pair of wood layers 34a, 34b, the board for a musical instrument 41 is capable of exerting vibration characteristics similar to those of wood, with the strength and the weather resistance being enhanced, similarly to the board for a musical instrument 1 shown in FIG. 1. In addition, since the first base layer 42 in the board for a musical instrument 41 is the porous layer containing a synthetic resin as a principal component as described above, vibration characteristics may be extensively adjusted, with enabling uniformization of the quality and reduction in weight to be facilitated.

The production method of the board for a musical instrument enables the board for a musical instrument 41 to be readily and reliably produced.

Fourth Embodiment

Board for Musical Instrument

Figure 5:
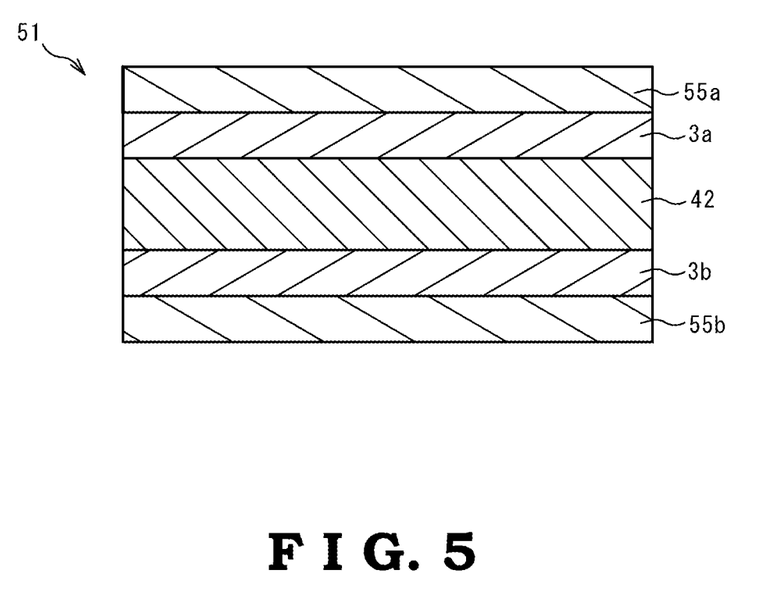
FIG. 5 is a schematic cross sectional view illustrating a board for a musical instrument according to an embodiment that differs from the boards for a musical instrument shown in FIGS. 1, 3 and 4.

The board for a musical instrument 51 shown in FIG. 5 includes: a first base layer 42; a pair of first reinforcement layers 3a, 3b laminated on both face sides of the first base layer 42; and a pair of second base layers 55a, 55b laminated on outer face sides of the pair of first reinforcement layers 3a, 3b. In other words, the board for a musical instrument 51 is provided with the second base layers 55a, 55b on the outer face sides of the pair of first reinforcement layers 3a, 3b of the board for a musical instrument 41 shown in FIG. 4. The pair of second base layers 55a, 55b are directly laminated on outer surfaces of the pair of first reinforcement layers 3a, 3b. The board for a musical instrument 51 is a five-layer structure in which the pair of second base layers 55a, 55b constitute outermost layers on both sides. The board for a musical instrument 51 has a similar configuration to the board for a musical instrument 41 shown in FIG. 4 except that the second base layers 55a, 55b are provided on the outer face sides of the pair of first reinforcement layers 3a, 3b. Thus, with respect to the first base layer 42 and the pair of first reinforcement layers 3a, 3b in the board for a musical instrument 51, the description is omitted through designating with the same reference numeral as those for the board for a musical instrument 41 shown in FIG. 4.

Second Base Layer

The pair of second base layers 55a, 55b are formed to be platy. The pair of second base layers 55a, 55b are porous layers each containing a synthetic resin as a principal component. The second base layers 55a, 55b may be composed of a foamed body of a synthetic resin, or may have a honeycomb structure (multi-tubular structure or multi-room structure). It is preferred that a principal component of the pair of second base layers 55a, 55b is identical to the principal component of the first base layer 42. In the case in which the pair of second base layers 55a, 55b are composed of the foamed body of the synthetic resin, a plurality of cells included in the second base layers 55a, 55b are preferably closed cells. Furthermore, the Young's modulus of each of the pair of second base layers 55a, 55b may be similar to that of the first base layer 42.

The lower limit of the average thickness of the second base layers 55a, 55b is preferably 100 µm. When the average thickness of the second base layers 55a, 55b is less than the lower limit, the overall thickness of the board for a musical instrument 51 may not be sufficiently increased, and a sufficiently broad applicable scope of the board for a musical instrument 51 may not be achieved.

It is preferred that in the board for a musical instrument 51, the principal components and the thicknesses of the first reinforcement layers 3a, 3b in the pair are identical, respectively, and the principal components and the thicknesses of the second base layers 55a, 55b in the pair are identical, respectively. Accordingly, symmetry of the board for a musical instrument 51 is enabled in terms of the material and the thickness of each layer on both sides in the thickness direction with respect to the first base layer 42 as a center portion. Thus, the board for a musical instrument 51 can be prevented from warping, thereby enabling the quality to be improved.

Production Method

A production method of the board for a musical instrument 51 includes steps of: preparing the first base layer 42; laminating the pair of first reinforcement layers 3a, 3b on both face sides of the first base layer 42; and laminating a pair of second base layers 55a, 55b on the outer face sides of the pair of first reinforcement layers 3a, 3b. The first reinforcement layer-laminating step in the production method of the board for a musical instrument may be carried out by similar procedures to those in the first reinforcement layer-laminating step for the board for a musical instrument 1 shown in FIG. 1. The second base layer-laminating step in the production method of the board for a musical instrument may be carried out by similar procedures to those in the wood layer-laminating step for the board for a musical instrument shown in FIG. 3.

Advantages

The overall thickness of the board for a musical instrument 51 can be greater due to including the second base layers 55a, 55b on the outer face sides of the pair of first reinforcement layers 3a, 3b. Further, in the case in which the principal component of the pair of second base layers 55a, 55b is identical to the principal component of the first base layer 42 in the board for a musical instrument 51, vibration characteristics corresponding to the principal components of the first base layer 42 and the pair of second base layers 55a, 55b are likely to be maintained.

The production method of the board for a musical instrument enables the board for a musical instrument 51 to be readily and reliably produced.

Fifth Embodiment

Board for Musical Instrument

Figure 6:
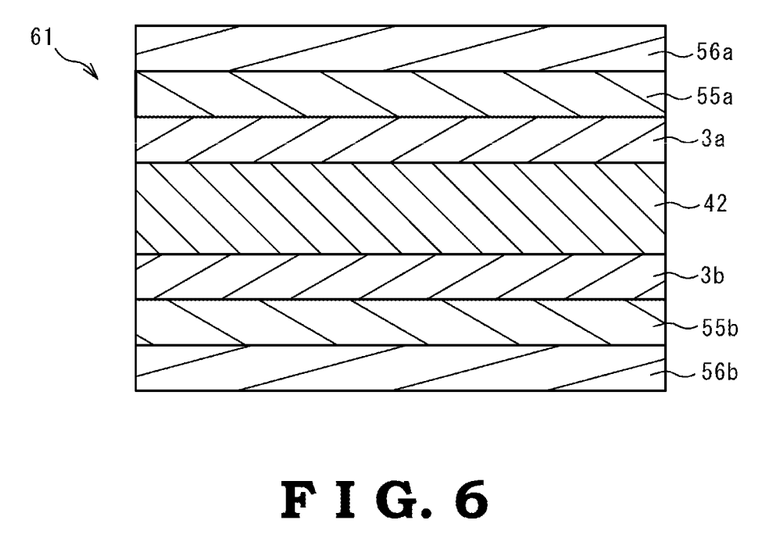
FIG. 6 is a schematic cross sectional view illustrating a board for a musical instrument according to an embodiment that differs from the boards for a musical instrument shown in FIGS. 1 and 3 to 5.

The board for a musical instrument 61 shown in FIG. 6 includes: a first base layer 42; a pair of first reinforcement layers 3a, 3b laminated on both face sides of the first base layer 42; a pair of second base layers 55a, 55b laminated on outer face sides of the pair of first reinforcement layers 3a, 3b; and a pair of second reinforcement layers 56a, 56b laminated on outer face sides of the pair of second base layers 55a, 55b. In other words, the board for a musical instrument 61 is provided with the second reinforcement layers 56a, 56b on the outer face sides of the pair of second base layers 55a, 55b of the board for a musical instrument 51 shown in FIG. 5. The pair of second reinforcement layers 56a, 56b are directly laminated on the outer surfaces of the pair of second base layers 55a, 55b. The board for a musical instrument 61 is a seven-layer structure in which the pair of second reinforcement layers 56a, 56b constitute outermost layers on both sides. The board for a musical instrument 61 has a similar configuration to the board for a musical instrument 51 shown in FIG. 5 except that the second reinforcement layers 56a, 56b are provided on the outer face sides of the pair of second base layers 55a, 55b. Thus, with respect to the first base layer 42, the pair of first reinforcement layers 3a, 3b and the pair of second base layers 55a, 55b in the board for a musical instrument 61, the description is omitted through designating with the same reference numerals as those for the board for a musical instrument 51 shown in FIG. 5.

Second Reinforcement Layer

The pair of second reinforcement layers 56a, 56b are formed to be platy. The pair of second reinforcement layers 56a, 56b include: a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber; and a binder therefor. It is preferred that a principal component of the pair of second reinforcement layers 56a, 56b is identical to the principal component of the pair of first reinforcement layers 3a, 3b. Moreover, a principal component of the binder included in the pair of second reinforcement layers 56a, 56b is preferably identical to a principal component of the binder included in the pair of first reinforcement layers 3a, 3b. The average thickness, the Young's modulus in the fiber orientation direction, and the specific gravity of the pair of second reinforcement layers 56a, 56b may be similar to those of the pair of first reinforcement layers 3a, 3b.

It is preferred that in the board for a musical instrument 61, the principal components and the thicknesses of the first reinforcement layers 3a, 3b in the pair are identical, respectively, the principal components and the thicknesses of the second reinforcement layers 56a, 56b in the pair are identical, respectively, and the principal components and the thicknesses of the second base layers 55a, 55b in the pair are identical, respectively. Accordingly, symmetry of the board for a musical instrument 61 is enabled in terms of the material and the thickness of each layer on both sides in the thickness direction with respect to the first base layer 42 as a center portion. Thus, the board for a musical instrument 61 can be prevented from warping, thereby enabling the quality to be improved.

Production Method

A production method of the board for a musical instrument 61 includes steps of: preparing the first base layer 42; laminating the pair of first reinforcement layers 3a, 3b on both face sides of the first base layer 42; laminating the pair of second base layers 55a, 55b on outer face sides of the pair of first reinforcement layers 3a, 3b; and laminating a pair of second reinforcement layers 56a, 56b on outer face sides of the pair of second base layers 55a, 55b. The first reinforcement layer-laminating step and the second reinforcement layer-laminating step in the production method of the board for a musical instrument may be carried out by similar procedures to those in the first reinforcement layer-laminating step for the board for a musical instrument 1 shown in FIG. 1. The second base layer-laminating step in the production method of the board for a musical instrument may be carried out by similar procedures to those in the wood layer-laminating step for the board for a musical instrument shown in FIG. 3. Alternatively, the production method of the board for a musical instrument which may be adopted includes: preparing laminate of the first base layer 42 and the pair of first reinforcement layers 3a, 3b, and a laminate of the second base layers 55a, 55b and the second reinforcement layers 56a, 56b, respectively; and adhering these laminates with an adhesive.

Advantages

The overall thickness of the board for a musical instrument 61 can be greater with the vibration characteristics similar to those of wood being maintained, due to including the second base layers 55a, 55b and the second reinforcement layers 56a, 56b in this order on the outer face sides of the pair of first reinforcement layers 3a, 3b. Further, in the case in which the principal component of the pair of second base layers 55a, 55b is identical to the principal component of the first base layer 42 in the board for a musical instrument 61, vibration characteristics corresponding to the principal components of the first base layer 42 and the pair of second base layers 55a, 55b are likely to be maintained. Furthermore, it is considered that the strength of both face sides can be enhanced and the vibration characteristics similar to those of wood are more likely to be exhibited in the case of: providing the reinforcement layer including: the polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber; and the binder therefor at a position on the outer side of the base layer, and closer to the outer face side in the board for a musical instrument 61. In these regards, since the board for a musical instrument 61 includes the pair of second reinforcement layers 56a, 56b on the outer sides of the pair of second base layers 55a, 55b, enhancement of the strength of both face sides is enabled, while enabling the vibration characteristics more similar to those of wood to be exhibited.

In addition, the board for a musical instrument 61 enables the production cost to be reduced in the case of: not only using the principal component of the pair of second base layers 55a, 55b being identical to the principal component of the first base layer 42; but also using the principal component of the pair of second reinforcement layers 56a, 56b being identical to the principal component of the pair of first reinforcement layers 3a, 3b.

The production method of the board for a musical instrument enables the board for a musical instrument 61 to be readily and reliably produced.

Sixth Embodiment

Board for Musical Instrument

Figure 7:
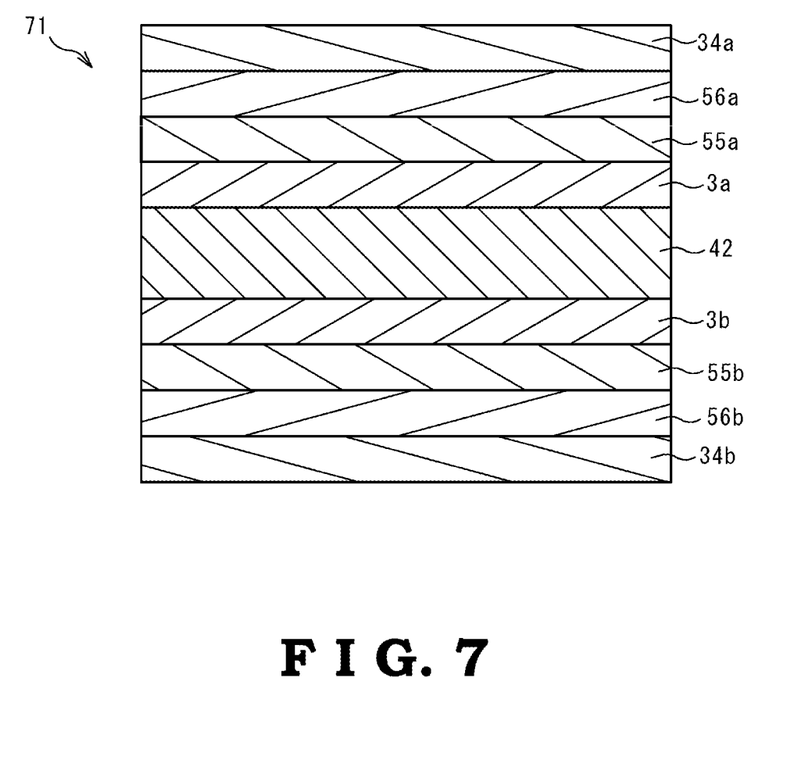
FIG. 7 is a schematic cross sectional view illustrating a board for a musical instrument according to an embodiment that differs from the boards for a musical instrument shown in FIGS. 1 and 3 to 6.

The board for a musical instrument 71 shown in FIG. 7 includes: a first base layer 42; a pair of first reinforcement layers 3a, 3b laminated on both face sides of the first base layer 42; a pair of second base layers 55a, 55b laminated on outer face sides of the pair of first reinforcement layers 3a, 3b; a pair of second reinforcement layers 56a, 56b laminated on outer face sides of the pair of second base layers 55a, 55b: and a pair of wood layers 34a, 34b laminated on outer face sides of the pair of second reinforcement layers 56a, 56b. The pair of wood layers 34a, 34b constitute outermost layers on both sides of the board for a musical instrument 71. Specific structures of the first base layer 42, the pair of first reinforcement layers 3a, 3b, the pair of second base layers 55a, 55b and the pair of second reinforcement layers 56a, 56b in the board for a musical instrument 71 may be similar to those of the board for a musical instrument 61 shown in FIG. 6. Further, specific structures of the pair of wood layers 34a, 34b in the board for a musical instrument 71 may be similar to those of the board for a musical instrument 31 shown in FIG. 3.

Production Method

A production method of the board for a musical instrument 71 includes steps of: preparing the first base layer 42; laminating the pair of first reinforcement layers 3a, 3b on both face sides of the first base layer 42; laminating the pair of second base layers 55a, 55b on outer face sides of the pair of first reinforcement layers 3a, 3b; laminating a pair of second reinforcement layers 56a, 56b on outer face sides of the pair of second base layers 55a, 55b; and laminating a pair of wood layers 34a, 34b on outer face sides of the pair of second reinforcement layers 56a, 56b. The first reinforcement layer-laminating step, the second base layer-laminating step and the second reinforcement layer-laminating step in the production method of the board for a musical instrument may be carried out by similar procedures to those in the first reinforcement layer-laminating step, the second base layer-laminating step and the second reinforcement layer-laminating step for the board for a musical instrument 61 shown in FIG. 6. In addition, the wood layer-laminating step in the production method of the board for a musical instrument may be carried out by similar procedures to those in the wood layer-laminating step for the board for a musical instrument 31 shown in FIG. 3.

Advantages

The board for a musical instrument 71 is capable of exhibiting a woody tone appearance, due to including the pair of wood layers 34*a*, 34*b* as outermost layers. Furthermore, sine the board for a musical instrument 71 includes the pair of wood layers 34*a*, 34*b* as the outermost layers, incorporation thereof into a stringed instrument or the like can be readily executed by a similar procedure to those for conventional wood boards.

The production method of the board for a musical instrument enables the board for a musical instrument 71 to be readily and reliably produced.

Other Embodiments

It is to be noted that the board for a musical instrument and the stringed instrument according to the modes of the present disclosure may also be put into practical use in various modified or altered modes other than those described in the foregoing. For example, the board for a musical instrument may include other layer such as a resin layer and a wood layer: between the first base layer and the pair of first reinforcement layers; between the pair of first reinforcement layers and the pair of second base layers; between the pair of second base layers and the pair of second reinforcement layers; or between the pair of second reinforcement layers and the pair of wood layers.

As long as the first base layer, and the pair of first reinforcement layers laminated on both face sides of the first base layer are included, the board for a musical instrument may include the second base layer and the second reinforcement layer being laminated only on the outer side of one first reinforcement layer.

The board for a musical instrument may be configured as a laminate of eight or more layers by alternately including the second base layer and the second reinforcement layer on the outer face sides of the pair of first reinforcement layers. Accordingly, desired thickness and desired vibration characteristics are likely to be attained by the board for a musical instrument. In this case, it is preferred in the board for a musical instrument, that principal components of the first base layer and all the second base layers are identical, and that principal components of the pair of first reinforcement layers and all the second reinforcement layers are identical. According to the board for a musical instrument, desired strength and desired vibration characteristics similar to those of wood are likely to be attained more accurately with reduced production cost, by thus using the principal components of all the base layers being identical, and the principal components of all the reinforcement layers being identical. Additionally, in the case of alternately including the second base layer and the second reinforcement layer on the outer face sides of the pair of first reinforcement layers, it is preferred that in the board for a musical instrument, the number of the second base layer and the number of the second reinforcement layer laminated on both sides of the first base layer are the same. Furthermore, it is preferred in the board for a musical instrument that: the principal components and the thicknesses of the first reinforcement layers in the pair are identical, respectively; the principal components and the thicknesses of the plurality of the second reinforcement layers are identical, respectively; and the principal components and the thicknesses of the plurality of second base layers are identical, respectively. Accordingly, the board for a musical instrument can be prevented from warping, thereby enabling the quality to be improved.

In addition, the board for a musical instrument may also include as the other layer, a reinforcement layer including a fiber other than the polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber; and the binder therefor. Furthermore, it is preferred that each layer is directly laminated in the board for a musical instrument; however, for example, the first base layer and the pair of first reinforcement layers may be laminated via an adhesive layer, or the pair of second base layers and the pair of second reinforcement layers may be laminated via an adhesive layer.

In the first base layer and second base layer, even in the case of the porous layer containing a synthetic resin as a principal component, these first base layer and second base layer may not necessarily be foamed bodies of synthetic resins. Cells in the first base layer and the second base layer may be formed from cell-forming particles such as micro balloons, for example.

The first reinforcement layer and the second reinforcement layer may be formed from pre-pregs prepared by impregnating a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber with a thermoplastic resin. Furthermore, the first reinforcement layer and the second reinforcement layer may not necessarily be formed from the pre-pregs, and may be formed by, for example; applying a coating liquid in which the fiber is dispersed in a resin composition containing a binder resin and an organic solvent; and then heating. The first reinforcement layer and the second reinforcement layer may be formed by sticking the fiber to the base layer with an adhesive.

In a case in which the principal component of the first base layer is wood, the board for a musical instrument may be a five-layer structure including the second base layer on the outer side of the pair of first reinforcement layers. In this case, the principal component of the second base layer is preferably identical to the principal component of the first base layer. In this case, it is also preferred that the principal components in the pair of first reinforcement layers are identical. Moreover, in the board for a musical instrument, it is preferred that the principal components and the thicknesses of the second base layers in the pair are identical, respectively, and that the principal components and the thicknesses of the first reinforcement layers in the pair are identical, respectively.

In a case in which the principal component of the first base layer is wood, the board for a musical instrument may be a seven-layer structure including the second reinforcement layer on the outer side of the pair of second base layers. In this case, the principal component of the second base layer is preferably identical to the principal component of the first base layer. In this case, it is also preferred that the principal components of the first reinforcement layers in the pair and the principal components of the second reinforcement layers in the pair are all identical. Moreover, in the board for a musical instrument, it is preferred that: the principal components and the thicknesses of the second base layers in the pair are identical, respectively; the principal components and the thicknesses of the first reinforcement layers in the pair are identical, respectively; and the principal components and the thicknesses of the second reinforcement layers in the pair are identical, respectively.

In a case in which the principal component of the first base layer is wood, the board for a musical instrument may be configured as a laminate of eight or more layers by alternately including the second base layer and the second reinforcement layer on the outer face sides of the pair of first reinforcement layers. Additionally, in the case of being configured as the laminate of eight or more layers, it is preferred that all the principal components of the first base layer and the plurality of second base layer in the board for a musical instrument are identical. It is also preferred that all the principal components of the pair of first reinforcement layers and the plurality of second reinforcement layer are identical. Moreover, in the case of alternately including the second base layer and the second reinforcement layer on the outer face sides of the pair of first reinforcement layers, it is preferred that in the board for a musical instrument, the number of the second base layer and the number of the second reinforcement layer laminated on both sides of the first base layer are the same. Furthermore, it is preferred in the board for a musical instrument that: the principal components and the thicknesses of the first reinforcement layers in the pair are identical, respectively; the principal components and the thicknesses of the plurality of the second reinforcement layers are identical, respectively; and the principal components and the thicknesses of the plurality of second base layers are identical, respectively.

The polyparaphenylenebenzobisoxazole fiber, the liquid crystal polyester fiber, the aramid fiber, the polyarylate fiber, the ultra high-molecular weight polyethylene fiber, the polyethylene naphthalate fiber or the glass fiber included in the first reinforcement layer and the second reinforcement layer is preferably orientated along one direction that is substantially perpendicular to the thickness direction, in light of an increase in rigidity and in light of approximation of the attenuation ratios of the first reinforcement layer and the second reinforcement layer to the attenuation ratio of wood. However, the fiber included in the first reinforcement layer and the second reinforcement layer may not necessarily be orientated along one direction in a case in which rigidity anisotropy is not strenuously required.

As the fiber included in the first reinforcement layer and the second reinforcement layer, a silicon carbide (SiC) fiber, a boron fiber or the like may be also used. These fibers also enable sufficient reinforcement effects to be achieved.

The stringed instrument may include as a sound board, in place of the board for a musical instrument 1 shown in FIG. 1, the board for a musical instrument 31, 41, 51, 61 or 71 shown in FIGS. 3 to 7. In addition, the stringed instrument may also include as a sound board, the board for a musical instrument described in Other Embodiments.

The stringed instrument is not limited to the acoustic guitar described above and may be for example, an electric acoustic guitar, a violin, a cello, a mandolin or the like. Also, the board for a musical instrument may be used as a body sound board to be provided on the back face side.

Furthermore, the board for a musical instrument may be used as a vibration plate for, in addition to the aforementioned stringed instruments, keyboard musical instruments such as piano.

Examples

Hereinafter, the present disclosure will be further specifically described by way of Examples, but the present disclosure is not limited to the following Examples.

Example

A board for a musical instrument was produced that includes a pair of first reinforcement layers having an average thickness of 90 µm and including a polyparaphenylenebenzobisoxazole fiber and an epoxy resin, on both faces of a hard foamed body having an average thickness of 270 µm and being prepared from polymethacryl imide. The pair of first reinforcement layers was laminated on the first base layer by: impregnating the polyparaphenylenebenzobisoxazole fiber with the epoxy resin; semihardening the epoxy resin to provide sheet-like pre-pregs; overlaying the pre-pregs on both faces of the first base layer; and carrying out heat pressing under a load of 150 kN, at a heating temperature of 135° C. for a heating time period of 1.0 hrs. The polyparaphenylenebenzobisoxazole fiber in the pair of first reinforcement layers was orientated along one direction that is substantially perpendicular to the thickness direction. Cells in the first base layer were all closed cells, and the Young's modulus of the first base layer was 105 MPa. Furthermore, the Young's modulus of the polyparaphenylenebenzobisoxazole fiber in the orientation direction of the pair of first reinforcement layers was 130 GPa.

Comparative Example

A board for a musical instrument was produced that includes: a pair of first reinforcement layers having an average thickness of 90 µm and including a carbon fiber and an epoxy resin, on both faces of a first base layer similar to that of the Example. The pair of first reinforcement layers was laminated on the first base layer by: impregnating the carbon fiber with the epoxy resin; semihardening the epoxy resin to provide sheet-like pre-pregs; overlaying the pre-pregs on both faces of the first base layer; and carrying out heat pressing under a condition similar to that of the Example. The carbon fiber in the pair of first reinforcement layers was orientated along one direction that is substantially perpendicular to the thickness direction. The Young's modulus of the carbon fiber in the orientation direction of the pair of first reinforcement layers was 110 MPa.

Mode-Attenuation Ratio

Rectangular test pieces (length in longitudinal direction: 230 mm; length in crosswise direction 100 mm) of the boards for a musical instrument of Example and Comparative Example were subjected to a simulation for determining mode-attenuation ratios. Relationships between the vibration mode and the mode-attenuation ratio are shown in FIG. 8.

Results of Evaluations

Figure 8:
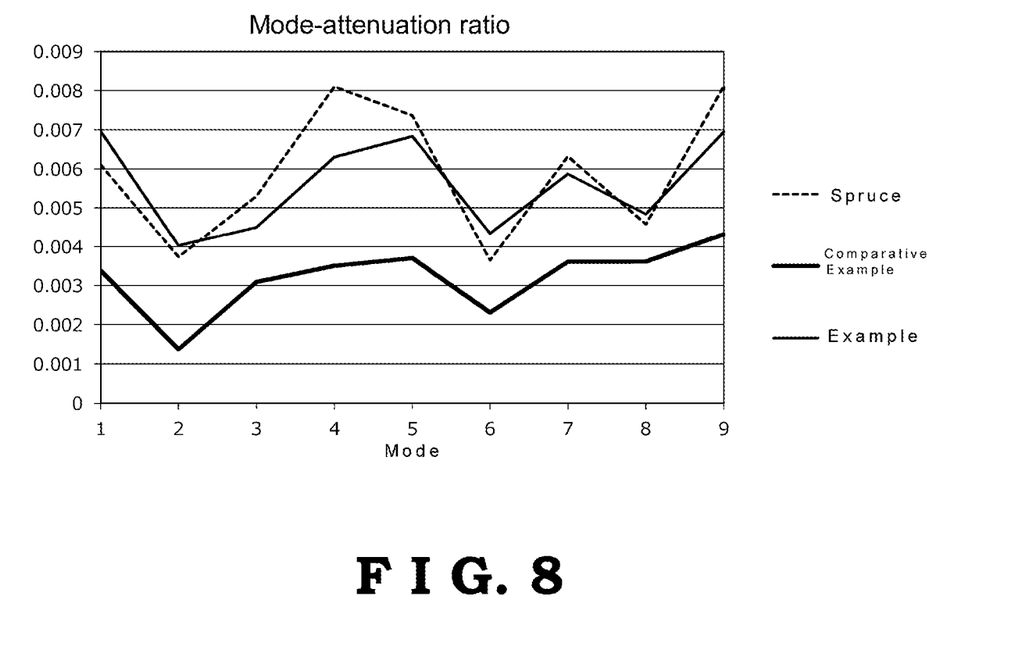
FIG. 8 is a graph showing relationships between a vibration mode and a logarithmic attenuation ratio in Example and Comparative Example.

As shown in FIG. 8, the board for a musical instrument of Example including the polyparaphenylenebenzobisoxazole fiber and the epoxy resin in the pair of first reinforcement layers was proven to have the mode-attenuation ratio for each mode being approximate to the board for a musical instrument consisting of spruce. In contrast, the board for a musical instrument of Comparative Example including the carbon fiber and the epoxy resin in the pair of first reinforcement layers was proven to have the mode-attenuation ratio for each mode being misfitting by 0.001 or more from the board for a musical instrument consisting of spruce.

INDUSTRIAL APPLICABILITY

As explained in the foregoing, the board for a musical instrument according the present disclosure is capable of exerting vibration characteristics similar to those of wood, with the strength and the weather resistance being enhanced, and therefore, the board is suited as a board for a musical instrument superior in acoustic characteristics. Furthermore, the stringed instrument according to the present disclosure is suitably used as a stringed instrument superior in acoustic characteristics.

What is claimed is:

1. A board for a musical instrument comprising:
    a first base layer;
    a pair of first reinforcement layers laminated on both face sides of the first base layer; and
    a second base layer provided on an outer face side of at least one of the first reinforcement layers, wherein
    the first reinforcement layers each comprise a fiber and a binder,
    the fiber is a polyparaphenylenebenzobisoxazole fiber, a liquid crystal polyester fiber, an aramid fiber, a polyarylate fiber, an ultra high-molecular weight polyethylene fiber, a polyethylene naphthalate fiber or a glass fiber, and
    a principal component of the second base layer is identical to a principal component of the first base layer.

2. The board for a musical instrument according to claim 1, wherein a principal component of the first base layer is wood.

3. The board for a musical instrument according to claim 1, wherein the first base layer is a porous layer comprising a synthetic resin as a principal component.

4. The board for a musical instrument according to claim 1, further comprising a second reinforcement layer provided on an outer face side of the second base layer, wherein
    a principal component of the second reinforcement layer is identical to a principal component of the first reinforcement layer.

5. A stringed instrument comprising the board for a musical instrument according to claim 1 as a sound board.

* * * * *